US011887062B2

(12) United States Patent
Wei et al.

(10) Patent No.: US 11,887,062 B2
(45) Date of Patent: *Jan. 30, 2024

(54) PROACTIVELY DISPLAYING RELEVANT INFORMATION RELATED TO AN EVENT ON A SEARCH PAGE

(71) Applicant: Microsoft Technology Licensing, LLC, Redmond, WA (US)

(72) Inventors: Yuan Wei, Kirkland, WA (US); Wayne Sun, South River, NJ (US); Tali Roth, Kirkland, WA (US); Miles Cole Fitzgerald, New York, NY (US); Michael Francis Palermiti, II, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,002

(22) Filed: Feb. 3, 2022

(65) Prior Publication Data

US 2022/0156702 A1 May 19, 2022

Related U.S. Application Data

(63) Continuation of application No. 16/395,014, filed on Apr. 25, 2019, now Pat. No. 11,244,287.

(51) Int. Cl.
*G06F 3/0482* (2013.01)
*G06Q 10/10* (2023.01)
(Continued)

(52) U.S. Cl.
CPC ....... *G06Q 10/1095* (2013.01); *G06F 3/0482* (2013.01); *G06F 16/9535* (2019.01); *G06F 16/9538* (2019.01)

(58) Field of Classification Search
CPC .............. G06Q 10/1095; G06F 3/0482; G06F 16/9535; G06F 16/9538; G06F 16/9035
See application file for complete search history.

(56) References Cited

U.S. PATENT DOCUMENTS 7,200,638 B2 * 4/2007 Lake ....................... H04L 67/54
709/224
8,495,508 B2 * 7/2013 Lebrun .................. G06Q 30/02
715/769

(Continued)

OTHER PUBLICATIONS

"Office Action Issued in European Patent Application No. 20720690.5", dated Mar. 3, 2023, 8 pages.

(Continued)

*Primary Examiner* — Jordany Nunez
(74) *Attorney, Agent, or Firm* — Ray Quinney & Nebeker; James Bullough

(57) ABSTRACT

A method for proactively providing information to a user about an event involving the user includes receiving user input indicating a request to display a search page and displaying the search page in response to the user input. In addition, event information may be automatically obtained and displayed on the search page in response to the user input. Some examples of event information that may be provided include participant information about a participant in the event other than the user, file information about a file that is relevant to the event, and conversation information about a conversation that is relevant to the event.

20 Claims, 9 Drawing Sheets

(51) Int. Cl.
*G06F 15/16* (2006.01)
*G06Q 10/1093* (2023.01)
*G06F 16/9535* (2019.01)
*G06F 16/9538* (2019.01)

(56) References Cited

U.S. PATENT DOCUMENTS

| | | | | |
|---|---|---|---|---|
| 9,031,216 B1* | 5/2015 | Kamvar | ................ | G10L 15/08 |
| | | | | 379/202.01 |
| 9,148,394 B2* | 9/2015 | Lynch | ................ | H04L 51/046 |
| 9,262,175 B2* | 2/2016 | Lynch | ................ | G06Q 10/00 |
| 9,661,041 B2* | 5/2017 | Cohen | ................ | H04L 67/306 |
| 9,946,771 B2* | 4/2018 | Shaw | ................ | G06F 16/9574 |
| 9,973,550 B2* | 5/2018 | Haskins | ................ | H04L 65/403 |
| 10,127,527 B1* | 11/2018 | Mueller | ................ | G06Q 10/1097 |
| 10,462,217 B2* | 10/2019 | Song | ................ | H04W 4/08 |
| 10,475,000 B2* | 11/2019 | Sarrazin | ................ | G06Q 10/107 |
| 10,664,772 B1* | 5/2020 | Poel | ................ | G06F 3/04842 |
| 10,664,929 B2* | 5/2020 | Childers | ................ | G06Q 30/0282 |
| 11,074,282 B2* | 7/2021 | Jagarlamudi | ................ | G06F 16/335 |
| 11,379,798 B2* | 7/2022 | Park | ................ | G06F 3/0482 |
| 11,416,817 B2* | 8/2022 | Toudji | ................ | G06F 16/353 |
| 11,488,113 B1* | 11/2022 | Schemers | ................ | G06Q 10/1095 |
| 2002/0131565 A1* | 9/2002 | Scheuring | ................ | G06Q 10/109 |
| | | | | 379/88.19 |
| 2005/0080859 A1* | 4/2005 | Lake | ................ | H04L 51/04 |
| | | | | 709/206 |
| 2006/0107221 A1* | 5/2006 | Haug | ................ | G06Q 10/107 |
| | | | | 715/752 |
| 2006/0288010 A1* | 12/2006 | Chen | ................ | G06F 21/41 |
| | | | | 707/999.009 |
| 2007/0226034 A1* | 9/2007 | Khan | ................ | G06Q 10/109 |
| | | | | 705/7.19 |
| 2009/0030766 A1* | 1/2009 | Denner | ................ | G06Q 10/06 |
| | | | | 705/7.19 |
| 2009/0292785 A1* | 11/2009 | Leedberg | ................ | H04L 51/04 |
| | | | | 709/206 |
| 2010/0223345 A1* | 9/2010 | Gupta | ................ | H04L 51/046 |
| | | | | 709/206 |
| 2013/0111356 A1* | 5/2013 | Vasudevan | ................ | H04M 1/27475 |
| | | | | 715/753 |
| 2013/0212492 A1* | 8/2013 | Chen | ................ | G06F 3/0484 |
| | | | | 715/753 |
| 2014/0035949 A1* | 2/2014 | Singh | ................ | G06Q 10/109 |
| | | | | 345/619 |
| 2014/0114943 A1* | 4/2014 | Holenweger | ................ | G06F 16/951 |
| | | | | 707/706 |
| 2015/0007056 A1* | 1/2015 | Cohen | ................ | H04W 4/02 |
| | | | | 715/753 |
| 2015/0019642 A1* | 1/2015 | Wang | ................ | G06Q 50/01 |
| | | | | 709/204 |
| 2015/0074558 A1* | 3/2015 | Haskins | ................ | H04W 4/02 |
| | | | | 715/753 |
| 2015/0081369 A1* | 3/2015 | Sarrazin | ................ | G06Q 10/107 |
| | | | | 705/7.18 |
| 2015/0088927 A1* | 3/2015 | Sarrazin | ................ | G06F 16/148 |
| | | | | 707/769 |
| 2015/0347532 A1* | 12/2015 | Shaw | ................ | G06F 3/0484 |
| | | | | 707/722 |
| 2016/0202866 A1* | 7/2016 | Zambetti | ................ | G06F 3/0488 |
| | | | | 715/835 |
| 2017/0063749 A1* | 3/2017 | Gupta | ................ | H04L 12/1822 |
| 2017/0083590 A1* | 3/2017 | Jagarlamudi | ................ | G06Q 10/109 |
| 2017/0116284 A1 | 4/2017 | Champaneria et al. | | |
| 2017/0118165 A1* | 4/2017 | Kumar | ................ | G06F 16/9537 |
| 2017/0154094 A1* | 6/2017 | Tien | ................ | G06F 16/2358 |
| 2017/0201575 A1* | 7/2017 | Song | ................ | H04L 51/216 |
| 2017/0308590 A1* | 10/2017 | Ramesan | ................ | H04L 51/046 |
| 2018/0124260 A1* | 5/2018 | Steplyk | ................ | H04N 1/00461 |
| 2018/0189362 A1* | 7/2018 | Shaw | ................ | G06F 16/24578 |
| 2018/0349471 A1* | 12/2018 | Toudji | ................ | G06F 16/2474 |
| 2021/0319049 A1* | 10/2021 | Jagarlamudi | ................ | G06Q 10/109 |
| 2021/0374683 A1* | 12/2021 | Park | ................ | G06Q 10/1095 |
| 2022/0012693 A1* | 1/2022 | Bennett | ................ | G06Q 10/06 |

OTHER PUBLICATIONS

"First Examination Report Issued in Indian Patent Application No. 202147049299", dated Sep. 8, 2023, 7 Pages.

* cited by examiner

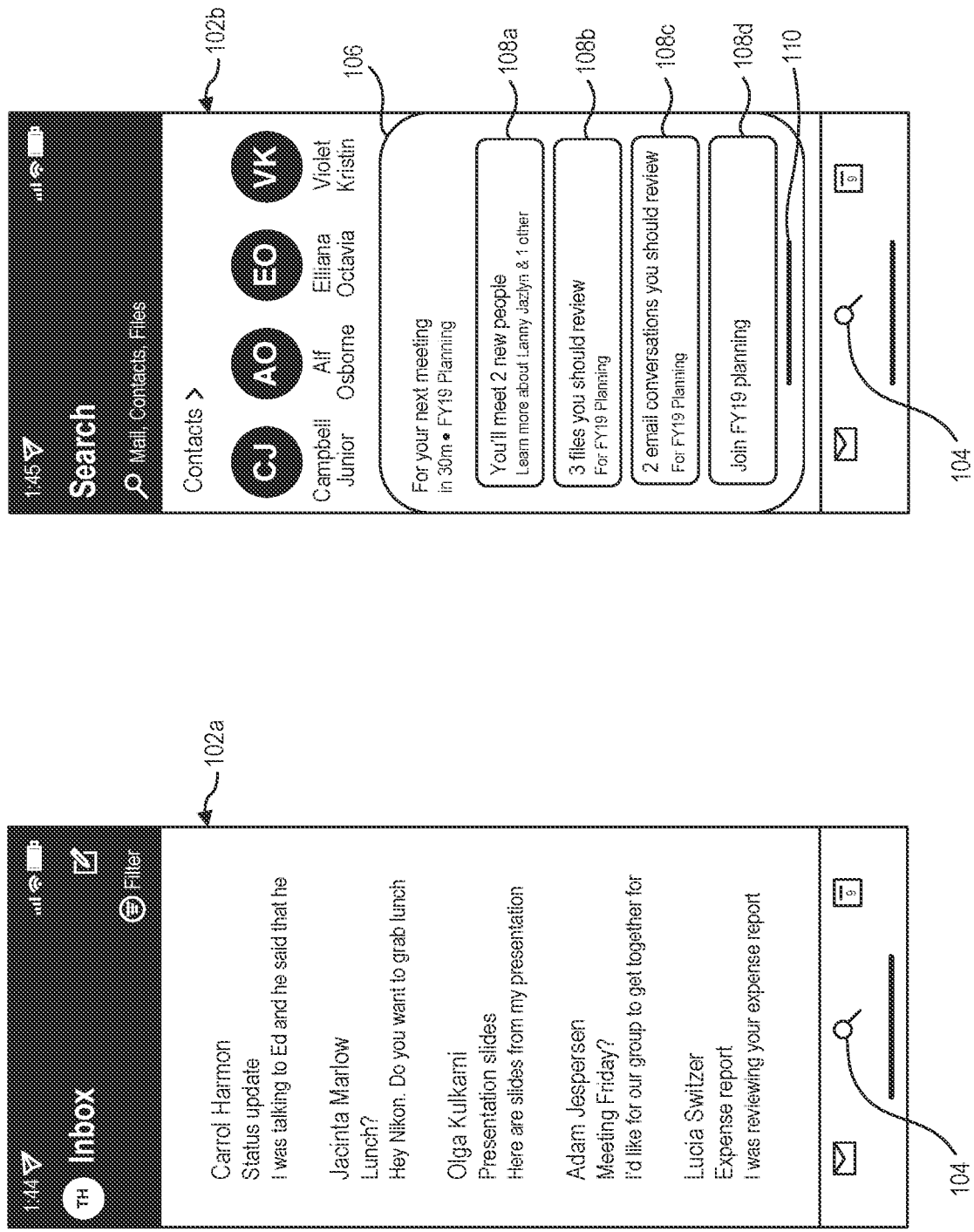

PROACTIVELY DISPLAYING RELEVANT INFORMATION RELATED TO AN EVENT ON A SEARCH PAGE

CROSS-REFERENCE TO RELATED APPLICATIONS

This application is a continuation of U.S. patent application Ser. No. 16/395,014, filed Apr. 25, 2019, which is hereby incorporated by reference in its entirety.

BACKGROUND

Computing technology has changed, and continues to change, our world in many important ways. Among other things, modern computing technology has significantly increased the amount of information that is available to many people. This has produced tremendous benefits for society. For example, learning about a new topic has become greatly simplified because of the amount of educational and reference material that is available via the Internet. In addition, people have more options for news sources than ever before. Communication technology has also increased the speed at which information may be exchanged with others. Instead of waiting days for documents to be received by a colleague in a far-away location, people all over the world may now exchange files in a matter of seconds via the Internet.

Notwithstanding these benefits, the surging volume of available information has a downside as well. The term "information overload" is often used to describe what happens when people are presented with more information than they are able to process effectively. Many people experience information overload when they consider how many messages (e.g., email messages, text messages, voice messages) they receive on a daily basis and how many additional sources of information (e.g., web sites, blog posts, books) are available that are related to work or other interests. Social media also contributes to information overload as many people feel pressure to read and comment on social media posts made by friends, family, and co-workers. Current research suggests that information overload can adversely affect not only personal well-being but also decision making, innovation, and productivity.

Some people use software to manage information related to their work and other aspects of their lives. One type of software application that is widely used today is often referred to as a personal information manager. A personal information manager facilitates the recording, tracking, and management of certain types of information about a person's life. A personal information manager may include one or more of an email client, a calendar, a contacts manager, a tasks manager, and note-taking functionality.

The use of a personal information manager, however, does not necessarily solve the problem of information overload. Consider a simple example in which a worker is invited to attend a meeting. The meeting's organizer may send the worker an email message that includes a calendar invitation for the meeting, and when the worker accepts the calendar invitation the meeting may be automatically scheduled as an event on the calendar within the worker's personal information manager. However, after the worker accepts the calendar invitation, a barrage of additional information (including email messages, text messages, phone calls, and social media notifications) may distract the worker. This may cause the worker to forget about the meeting entirely, or at least prevent the worker from preparing for the meeting (e.g., by reviewing relevant documents or email messages). Even if the calendar event includes a reminder, such a reminder is typically only provided a few minutes before the meeting begins. By that point it may be too late for the worker to adequately prepare for the meeting.

SUMMARY

In accordance with one aspect of the present disclosure, a method for proactively providing information to a user about an event involving the user is disclosed. The method includes receiving user input indicating a request to display a search page and displaying the search page in response to the user input. The method also includes automatically obtaining, in response to the user input, event information about the event involving the user and automatically displaying the event information on the search page.

The event information may include at least one of participant information about a participant in the event other than the user, file information about a file that is relevant to the event, or conversation information about a conversation that is relevant to the event.

The method may also include displaying a user interface element associated with the event information, receiving additional user input selecting the user interface element, and displaying additional event information in response to the additional user input selecting the user interface element.

In some embodiments, the event information may include a message notifying the user that there will be at least one potential new contact at the event. The additional event information may include at least one of a name of a participant in the event, a title of the participant, a department in which the participant works, or contact information for the participant.

In some embodiments, the event information may include a message about a file that the user should review prior to the event. The additional event information may include at least one of a filename corresponding to the file or a preview of the file.

In some embodiments, the event information may include a message about an email conversation that the user should review prior to the event. The additional event information may include at least one of a subject line associated with the email conversation or at least some portion of a message body of an email message belonging to the email conversation.

The event may be an upcoming event or a past event. If the event is an upcoming event, the may method additionally include displaying a shortcut action associated with the event. If the event is a past event, the may method additionally include displaying a summary of the event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. Those skilled in the art will understand that the drawings merely represent examples of particular embodiments, including examples of user interface pages that may be used to implement the inventive systems and methods disclosed herein. However, the disclosed systems and methods may be embodied in other specific forms without departing from the scope of the present disclosure.

For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 1A illustrates an example of a page that may be displayed by a personal information manager, the page including a search icon.

FIG. 1B illustrates an example of a search page that may be displayed in response to the user's selection of the search icon and event information that may be automatically displayed on the search page.

DETAILED DESCRIPTION

Figure 1D:
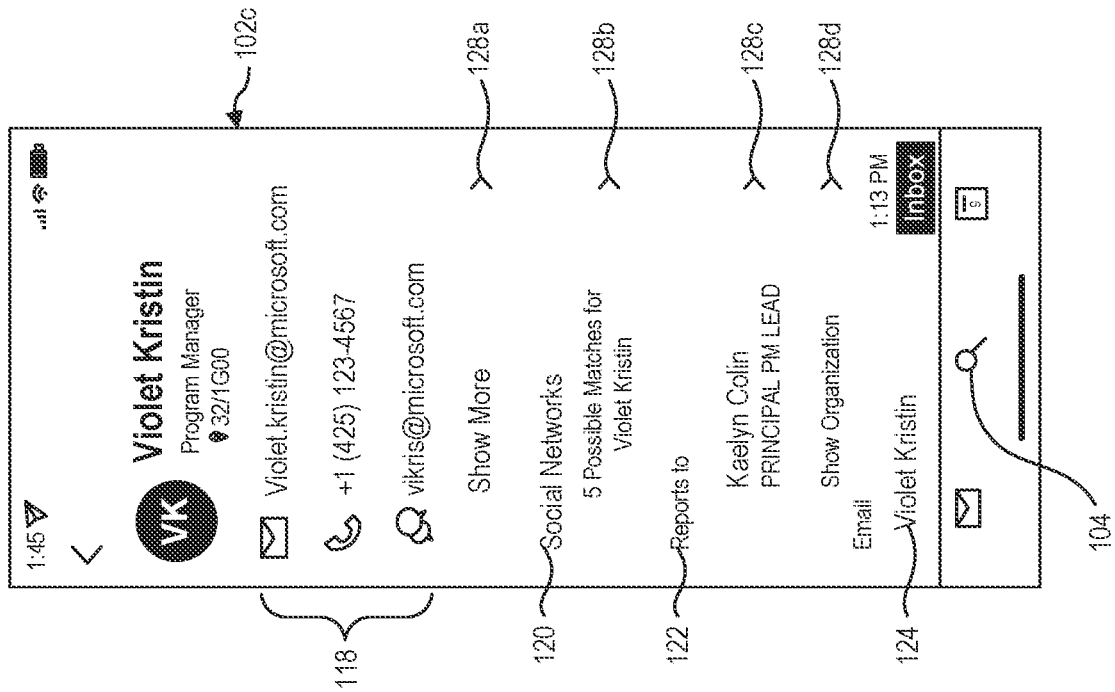
FIG. 1D illustrates additional information that may be displayed about a particular event participant in response to the user's selection of a user interface element associated with that event participant.

The present disclosure is generally related to proactively providing information to a user about an event involving the user. For purposes of the techniques disclosed herein, it will be assumed that a software application, such as a personal information manager, is being used to manage information related to various aspects of the user's life. The software application includes search functionality that enables the user to search the information (e.g., email messages, calendar events, tasks, contact information, notes) that is being stored in connection with the user's account (e.g., information stored in the user's mailbox). In accordance with the present disclosure, when the user takes some action that causes the software application to display a search page (e.g., tapping a search icon on a home page of the application), the software application automatically determines relevant information related to an event involving the user and displays the event information on the search page. In other words, once user input is received that indicates a request to display the search page, the software application automatically displays event information on the search page without requiring any additional user input.

The event for which the event information is displayed may be an upcoming event (i.e., an event that is scheduled to occur at some point in the future) or a past event (i.e., an event that has already occurred). In this context, the term "event information" includes any relevant information that is related to an event. There are many different types of event information that may be displayed. Some examples include information about one or more participants in the event (other than the user), information about one or more files that are relevant to the event, and information about one or more conversations (e.g., email conversations, instant messaging conversations, chat application conversations) that are relevant to the event.

The event information may include information that would be useful to make the event more efficient for the user. For example, the software application may scan a list of people who are scheduled to attend the event (as included, for example, in a calendar invitation for the event) and determine whether the event attendees are included in the user's contact list or recent contact history. If someone is identified who is scheduled to attend the event and is not included in the user's contact list or recent contact history, the software application may infer that the user has not previously met this individual and display a message indicating that there will be one potential new contact at the event (e.g., "You'll meet 1 new person . . . ").

The event information may be structured and presented in such a way that the user can "drill down" on event information that is of particular interest to the user. In some embodiments, the event information may be displayed in connection with one or more user interface (UI) elements (e.g., buttons). If the user would like to find out more about a certain type of event information, the user may simply select the UI element (e.g., by tapping or clicking on the UI element) to bring up additional event information that includes more detail.

Consider the example mentioned above in which the event information includes a message indicating that there will be one potential new contact at the event. This message may be displayed in connection with a UI element, such as a button. The potential new contact's name may also be displayed. If the user wants to find out more information about this potential new contact, the user may select the corresponding UI element. This causes additional information about the potential new contact to be displayed (e.g., the new contact's title, the department where the new contact works). This additional information may also be displayed in connection with a UI element, which the user can select to cause even more information about the potential new contact to be displayed (e.g., the new contact's email address and phone number, a link to connect with the new contact on social media).

As another example, suppose that the event information includes information about one or more files that are relevant to the event. Initially, a message about the file(s) may be displayed (e.g., "You have 3 files to review . . . ."). The user may select a UI element associated with that message in order to find out additional information about those files, such as the filenames. The user may select a UI element that is associated with a particular filename to cause a preview of the corresponding file to be displayed.

As yet another example, suppose that the event information includes information about one or more conversations that are relevant to the event. In this context, the term "conversation" refers to any type of message exchange between multiple people. Some examples of conversations include an email conversation, an instant messaging conversation, and a conversation in a chat application.

Initially, a message about the conversation(s) may be displayed (e.g., "You have 2 email conversations to review . . . ."). The user may select a UI element associated with that message in order to find out additional information about those conversations, such as the subject lines that are associated with email conversations. The user may select a UI element that is associated with a particular conversation to cause at least some portion of a message body of a message belonging to that conversation to be displayed.

The event information may include a shortcut action associated with the event. For example, if the event is an online meeting that is scheduled to occur at some point in the future, the event information may include a link to join the online meeting. When the meeting ends, another shortcut action may be displayed that prompts the user to record notes about the meeting. If the event is a past event, the event information may include an event summary. Some examples of information that may be included in an event summary include notes that the event participants have taken and any action items that were decided upon during the event.

FIGS. 1A-H illustrate examples of various aspects of a user interface of a software application that may be configured to proactively provide information to a user about an event in accordance with the present disclosure. In the example shown in 1A-F, it will be assumed that the software application is a personal information manager (PIM) that includes (at least) an email client, a calendar, a task manager, a contact manager, and note-taking functionality. It will also be assumed that user interface of the PIM is being displayed on a mobile computing device, such as a smartphone. However, the techniques disclosed herein may be used in connection with other types of software applications and other types of computing devices, and the scope of the present disclosure should not be limited to PIMs or mobile computing devices.

FIG. 1A illustrates a page 102a of the PIM that displays email messages that are currently in the user's inbox. This page 102a may be referred to herein as an email page 102a. The PIM includes search functionality that enables the user to search the information (e.g., email messages, calendar events, tasks, contact information, notes) that is being stored by the PIM. The page 102a includes a search icon 104. The user of the PIM may select the search icon 104 by, for example, tapping on the search icon 104. The user's selection of the search icon 104 causes a search page 102b to be displayed, as shown in FIG. 1B.

In response to the user's selection of the search icon 104, the PIM automatically determines information about an event involving the user and displays the event information on the search page 102b. In this context, the term "automatically" means without requiring additional user input. Thus, in response to the user's selection of the search icon 104, the PIM determines event information and displays the event information without requiring any additional user input. In other words, the user is not required to search for information about an event in order for event information to be displayed. Instead, the event information is automatically displayed to the user in response to the user's selection of the search icon 104.

In the example that is shown in FIG. 1B, the event is a meeting that is scheduled to occur in the future, and the event information is included in a window 106 that is displayed over the search page 102b. The window 106 includes a plurality of UI elements, which in the depicted example are buttons 108a-d. The buttons 108a-d each include some information about the event.

The first button 108a includes information about participants in the event (other than the user). In particular, the first button 108a includes a message indicating that the user will meet new people at the event. There are several different ways that this determination may be made. As one example, the PIM may scan a list of people who are scheduled to attend the event (as included, for example, in a calendar invitation for the event) and determine whether the event attendees are included in the user's contact list. As another example, the PIM may determine whether the user knows the people who are scheduled to attend the event based on the user's latest interactions with his or her contacts. Information about the user's latest interactions with his or her contacts could be obtained from various sources, such as the user's contact history cache, a connection graph, or the like. In the depicted example, the PIM has identified two people who are scheduled to attend the event and who are not included in the user's contact list or recent contact history. The message on the first button 108a includes the name of one of these people.

The second button 108b includes information about files that are relevant to the event, and the third button 108c includes information about email conversations that are relevant to the event. In particular, the second button 108b includes a message indicating that there are files that the user should review prior to the event, and the third button 108c includes a message indicating that there are email conversations that the user should review prior to the event. There are a variety of different ways that these files and conversations may be identified. For example, the PIM may scan a calendar invitation for the event and infer that any files and/or conversations that are attached to the calendar invitation are relevant and should be reviewed prior to the event. As another example, machine learning and artificial intelligence techniques may be utilized to identify relevant files and conversations. The PIM itself may be configured to utilize such techniques, and/or the PIM may coordinate with one or more other applications that are configured to utilize such techniques. In the depicted example, two relevant files and three relevant email conversations have been identified.

The fourth button 108d includes a shortcut action associated with the event. In the depicted example, the event is an online meeting and the shortcut action includes a link to join the online meeting. In other words, the user may join the online meeting by selecting the fourth button 108d. The PIM may itself include functionality that enables the user to join the online meeting, or the user's selection of the fourth button 108d may cause the PIM to launch another application that includes such functionality. In alternative embodiments other types of shortcut actions may be displayed. For example, if the event is a conference call, the shortcut action may include a link to join the call. As another example, the shortcut action may include one or more links to social media pages associated with other event participants.

The window 106 also includes a UI element, in the form of a bar 110, that enables the user to dismiss the window 106. If the user wants to search for other information instead of preparing for the event, the user may dismiss the window 106 by sliding the bar 110 upward.

Figure 1C:
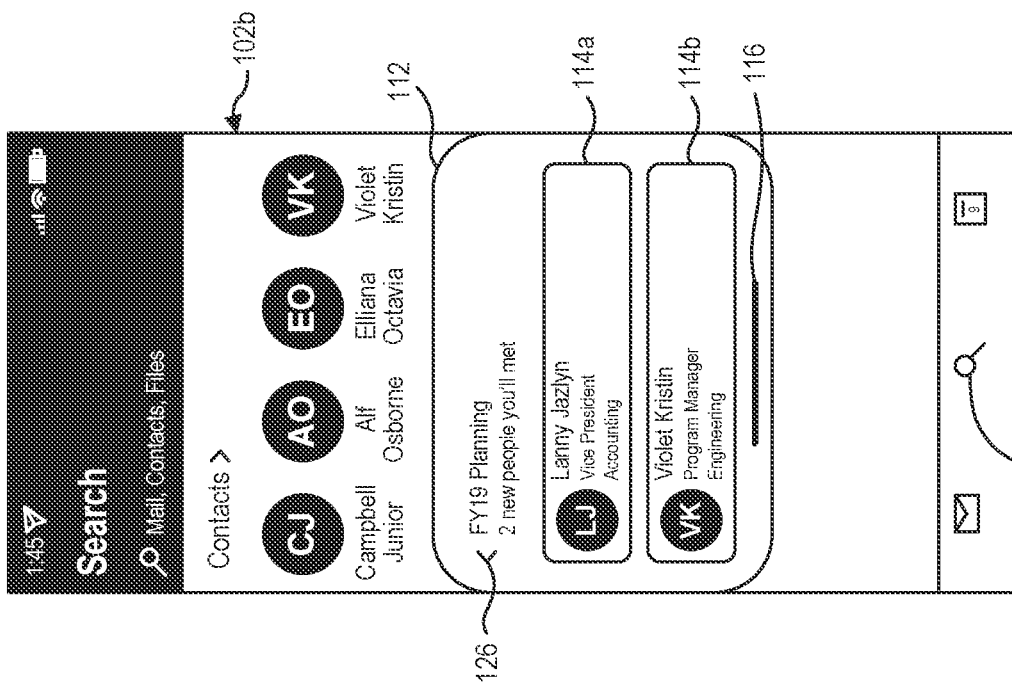
FIG. 1C illustrates an example showing additional information that may be displayed in response to the user's selection of a user interface element related to event participant information in connection with the search page shown in FIG. 1B.

If, however, the user does want to prepare for the event, the user may select one or more of the buttons 108*a-d* to find out more about any of the types of event information that are displayed in the window 106. For example, if the user wants to find out more about the people that the user will meet at the event, the user may select the first button 108*a*. This may cause the window 106 with all of the buttons 108*a-d* to be replaced by a window 112 that includes additional information about the people that the user will meet at the event, as shown in FIG. 1C.

As noted above, in the depicted example the PIM has identified two people who are scheduled to attend the event and who are not included in the user's contact list or recent contact history. The window 112 includes two additional buttons 114*a-b*, each of which corresponds to one of the potential new contacts. The window 112 includes more information about these new contacts than was displayed in the previous window 106. In particular, whereas the previous window 106 included a message indicating that the user will meet two new people at the event and providing the name of one of those individuals, the window 112 shown in FIG. 1C includes additional information (e.g., name, title, and department) about both of those individuals. The window 112 also includes a bar 116 that enables the user to dismiss the window 112, as well as another UI element in the form of a navigational arrow 126 that enables the user to return to the previously displayed window 106.

The user may also be permitted to find out even more information about either or both of the individuals whose names are shown on the buttons 114*a-b*. For example, if the user selects the second button 114*b* shown in FIG. 1C, then the search page 102*b* and the window 112 shown in FIG. 1C may be replaced by another page 102*c* that includes additional information about that individual, as shown in FIG. 1D. The page 102*c* shown in FIG. 1D may be referred to herein as a contact page 102*c*. The contact page 102*c* may include more information about the individual than was displayed in the window 112 shown previously. For example, the contact page 102*c* may include contact information 118 (e.g., email address, telephone number, instant messaging address), information 120 about social media pages corresponding to the individual, information 122 about the individual's supervisor within the organization, and one or more email messages 124 that the user has previously received from the individual.

The contact page 102*c* may also include additional UI elements that may be selected by the user to display even more information about the individual. In the depicted example, these additional UI elements take the form of navigational arrows 128*a-d*. For example, the user may select a navigational arrow 128*a* to find out additional contact information about the individual. Another navigational arrow 128*b* may be selected to navigate to social media sites that are related (or at least potentially related) to the individual. Other navigational arrows 128*c-d* may be selected to find out more information about the individual's supervisor and/or the department in which the individual works.

Thus, the event participant information may be presented in such a way that the user can "drill down" on particular individuals who are of special interest to the user. The window 106 shown in FIG. 1B includes a button 108*a* with high-level information about event participants (e.g., a message indicating that the user will meet new people at the event). By selecting this button 108*a*, additional information about at least some event participants (e.g., name, title, department) may be displayed in the window 112 shown in FIG. 1C. By selecting one of the buttons 114*a-b* in this window 112 corresponding to a particular individual, even more information about that individual may be displayed in the contact page 102*c* shown in FIG. 1D.

Figure 1F:
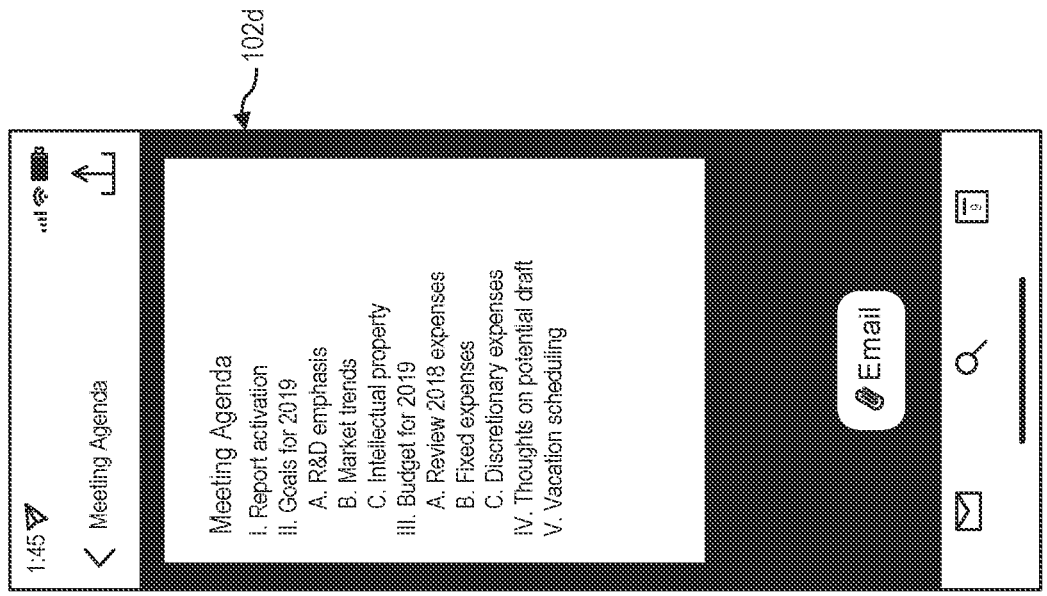
FIG. 1F illustrates an example of a preview of a file that may be displayed in response to the user's selection of a user interface element associated with that file.
Figure 1E:
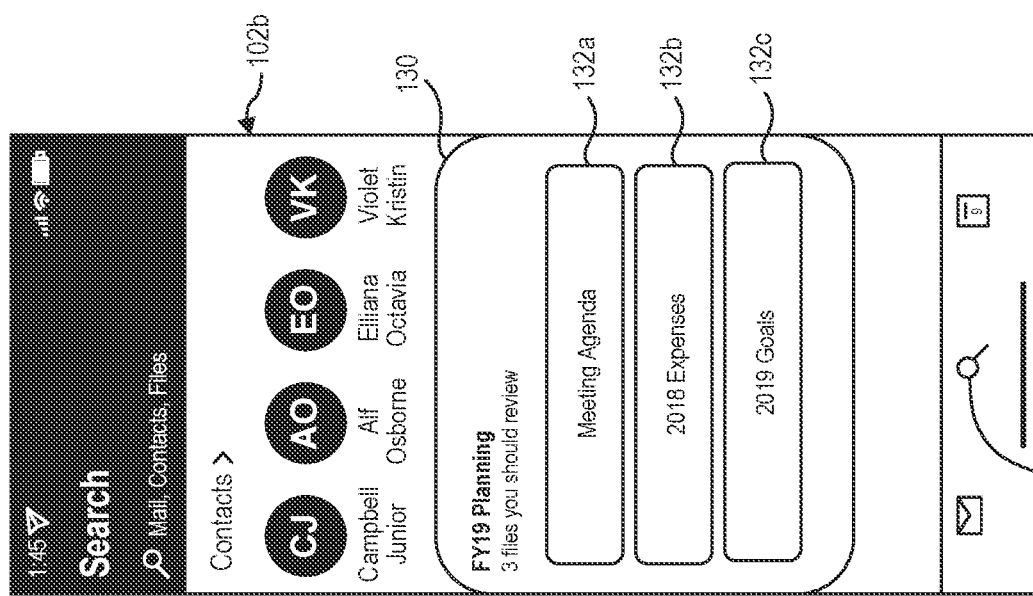
FIG. 1E illustrates an example showing additional information that may be displayed in response to the user's selection of a user interface element related to file information in connection with the search page shown in FIG. 1B.

Other types of event information may also be structured in a similar way. Referring briefly once again to FIG. 1B, suppose that the user selects the second button 108*b*, which includes information about files that are relevant to the event. This may cause the window 106 shown in FIG. 1B to be replaced by a window 130 that includes additional information about those files, as shown in FIG. 1E. The window 112 includes more information about the relevant files than was displayed in the previous window 106. In particular, whereas the previous window 106 included a message indicating that there are three files that the user should review prior to the event, the window 130 shown in FIG. 1E includes the specific filenames. The window 112 includes three additional buttons 132*a-c*, each of which includes a filename corresponding to one of the relevant files.

The user may also be permitted to view a preview of the relevant files. For example, the first button 132*a* shown in FIG. 1E corresponds to a file named "Meeting Agenda." If the user selects the first button 132*a*, then the search page 102*b* and the window 130 shown in FIG. 1E may be replaced by another page 102*d* that includes a preview of the "Meeting Agenda" file, as shown in FIG. 1F.

Figure 1H:
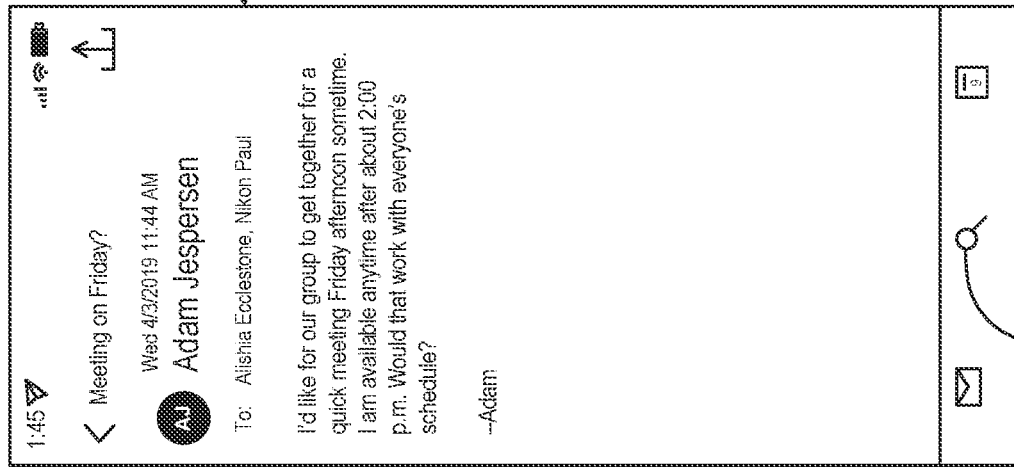
FIG. 1H illustrates additional information that may be displayed about a particular email conversation in response to the user's selection of a user interface element associated with that email conversation.
Figure 1G:
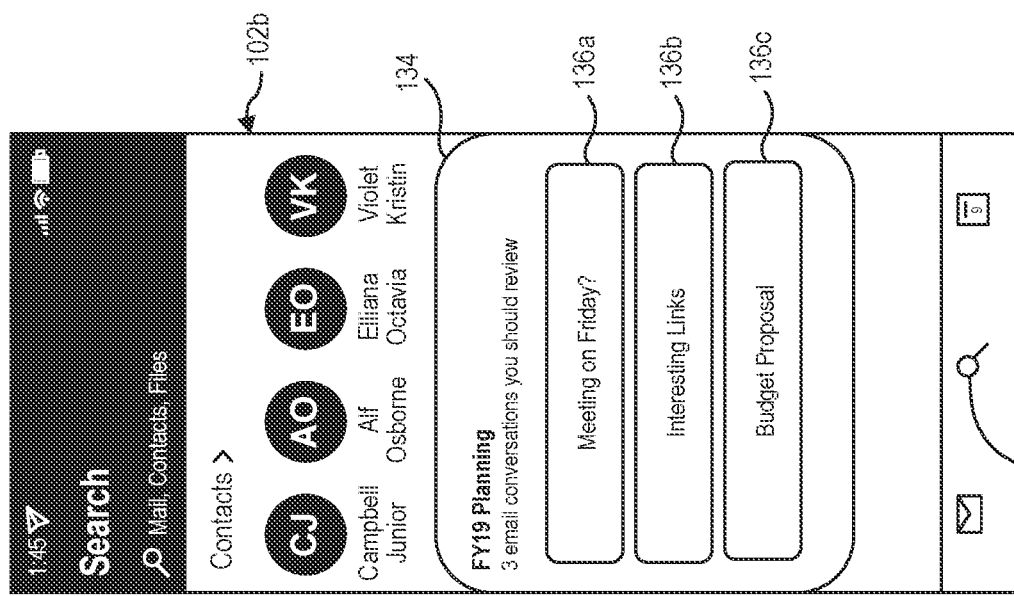
FIG. 1G illustrates an example showing additional information that may be displayed in response to the user's selection of a user interface element related to email conversation information in connection with the search page shown in FIG. 1B.

If the user selects the third button 108*c* shown in FIG. 1B, which includes information about email conversations that are relevant to the event, this may cause the window 106 shown in FIG. 1B to be replaced by a window 134 that includes additional information about those email conversations, as shown in FIG. 1G. The window 134 includes more information about the relevant email conversations than was displayed in the previous window 106. In particular, whereas the previous window 106 included a message indicating that there are three email conversations that the user should review prior to the event, the window 134 shown in FIG. 1G includes the subject lines associated with those email conversations. The window 112 includes three additional buttons 136*a-c*, each of which includes a subject line corresponding to one of the relevant email conversations.

If the user is interested in finding out more about any of those email conversations, the user may select one or more of the buttons 136*a-c*. For example, the first button 136*a* shown in FIG. 1G corresponds to an email conversation named "Meeting on Friday?" If the user selects the first button 136*a*, then the search page 102*b* and the window 134 shown in FIG. 1G may be replaced by another page 102*e* that includes at least some portion of the message body of this email message, as shown in FIG. 1H.

Figure 2:
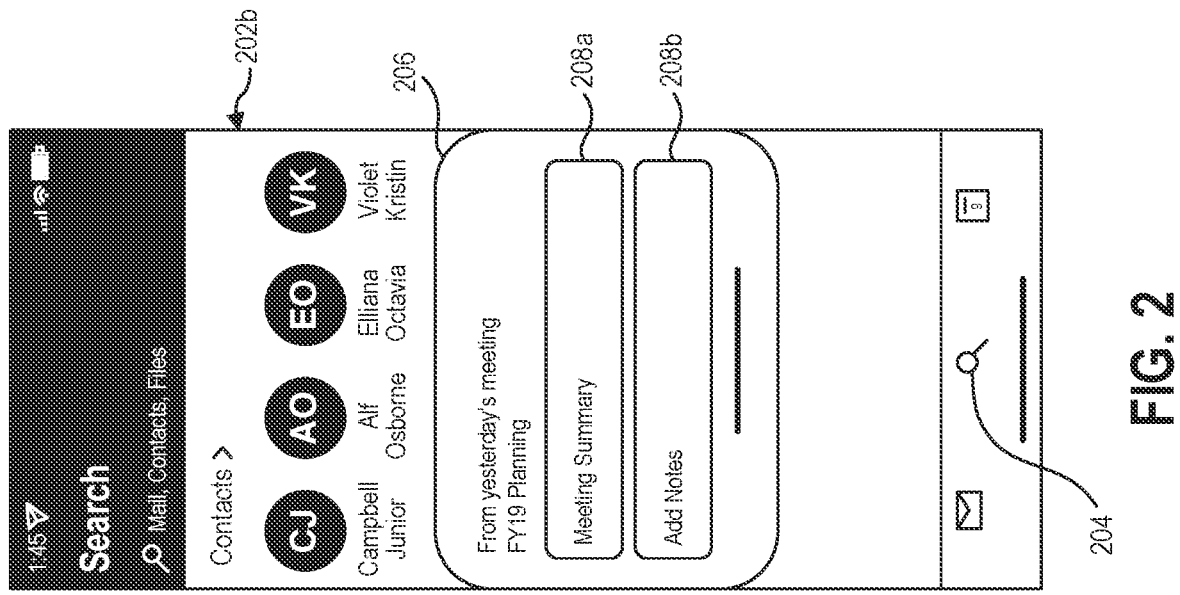
FIG. 2 illustrates an example of event information that may be automatically displayed on a search page in connection with a past event.

In the examples shown in FIGS. 1A-H, the event is an upcoming event. However, information about a past event may also be displayed in accordance with the present disclosure. FIG. 2 illustrates an example in which information about a past event involving the user is automatically displayed on the search page 202b. As before, the event information may be automatically determined and displayed in response to the user's selection of a search icon 204 on the search page 202b. The event information is included in a window 206 that is displayed over the search page 202b. The window 206 includes a plurality of UI elements, such as buttons 208a-b, both of which include some information about the event.

In the depicted example, the first button 208a includes a link to an event summary. The user may select the first button 208a to view the event summary. When the user selects the first button 208a, the event summary may be displayed in a separate window (not shown). Some examples of information that may be included in an event summary include notes that the event participants (including participants other than the user) have taken and any action items that were decided upon during the event. The second button 208b includes a link to a note-taking feature of the PIM (or a separate note-taking application) that allows the user to write down additional notes about the event.

Figure 3:
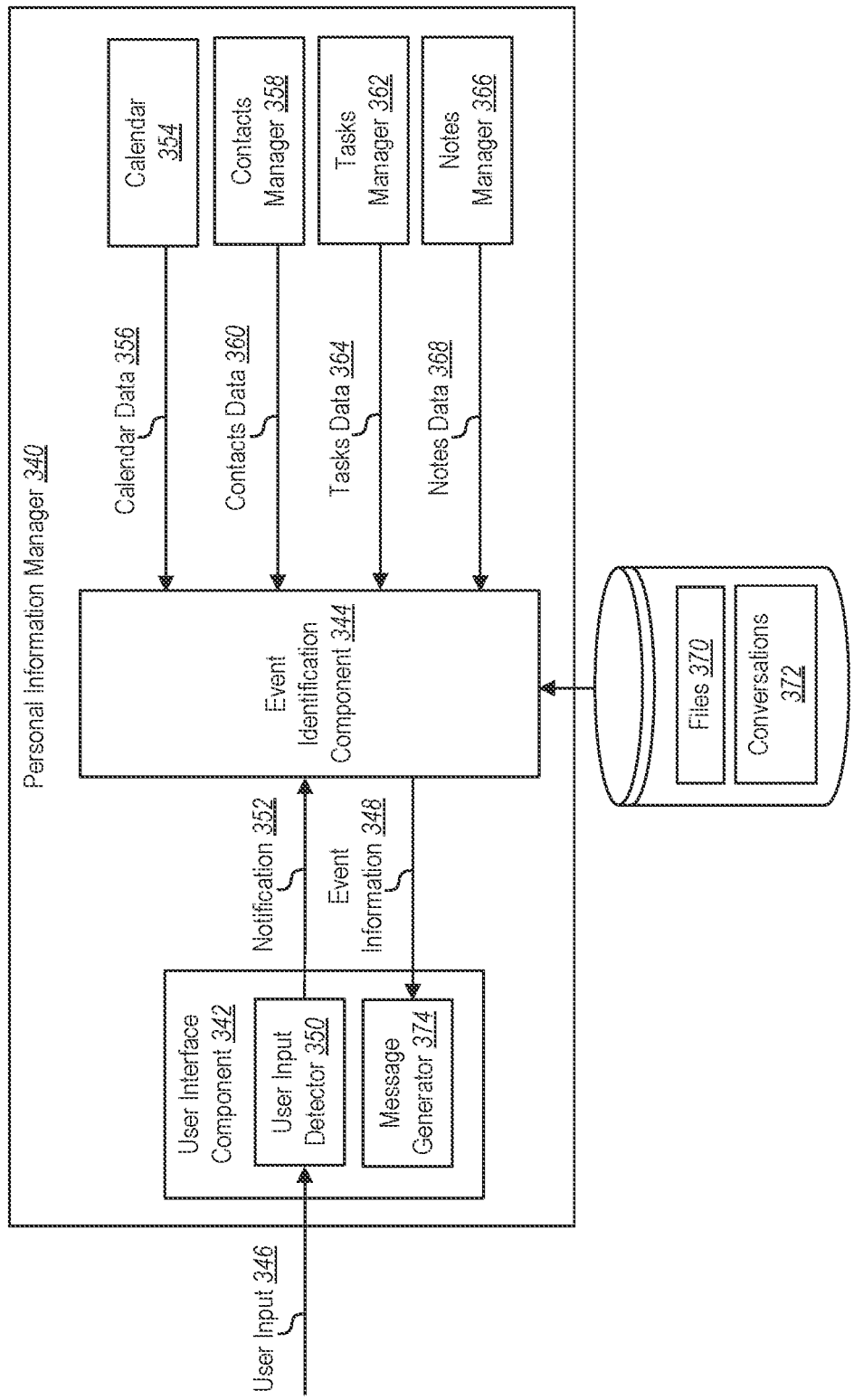
FIG. 3 illustrates examples of components that may be used to implement some aspects of the present disclosure.

FIG. 3 illustrates examples of components that may be used to implement some aspects of the present disclosure. As discussed above, the techniques disclosed herein may be implemented by a software application such as a personal information manager (PIM) 340. The PIM 340 may include a user interface component 342 that is configured to create and manage a user interface through which a user interacts with the PIM 340. The user interface component may be configured to create and display pages (such as the pages 102a-e, 202b described previously) having various UI elements (such as the search icons 104, 204, windows 106, 112, 130, and buttons 108a-d, 114a-b, 132a-c described previously).

The PIM 340 may also include a component that is configured to determine information about events involving the user. This component may be referred to herein as an event identification component 344. As discussed above, event information 348 may be automatically determined and displayed in response to receiving user input 346 indicating a request to display a search page 102b. The user interface component 342 may include a component that detects user input. This component may be referred to herein as a user input detector 350. The user input detector 350 may be configured to detect user input 346 indicating a request to display a search page 102b. For example, the user input detector 350 may be configured to detect the user's selection of a search icon 104 on another page 102a that is displayed by the PIM 340. If this type of user input 346 is detected, a notification 352 about the user input 346 may be provided to the event identification component 344. In response, the event identification component 344 may return event information 348 that should be displayed to the user on the search page 102b. The user interface component 342 is shown with a message generator 374 for providing the functionality of displaying the event information 348 on the search page 102b.

The event identification component 344 may obtain the event information 348 from a variety of sources. For example, the PIM 340 may include a calendar 354, and the event identification component 344 may obtain calendar data 356 from the calendar 354. Alternatively, or in addition, the event identification component 344 may obtain calendar data 356 from one or more other applications or services that are external to the PIM 340. The event identification component 344 may analyze the calendar data 356 to identify information about events involving the user. Some examples of the kinds of information that the calendar data 356 may provide about a future event include the time that the event will occur, the place where the event will occur, and people who are scheduled to attend the event. Similar information may also be provided about a past event. In addition, other information such as a summary of the event (e.g., decisions that were made, action items that were assigned) may also be provided. Under some circumstances, the calendar data 356 about an event may include file(s) and/or conversation(s) that are relevant to the event. Such file(s) and/or conversation(s) may be included as attachments to a calendar invitation that is sent to the user to schedule the event.

The PIM 340 may also include a contacts manager 358, and the event identification component 344 may obtain contacts data 360 from the contacts manager 358. Alternatively, or in addition, the event identification component 344 may obtain contacts data 360 from one or more other applications or services that are external to the PIM 340. The contacts data 360 may include information about individuals who are included in one or more contact lists that are maintained by the user. Some examples of the kind of information that the contacts data 360 may provide about a particular person include that person's name, contact information for that person (e.g., email address, phone number, instant messaging number), the name of an organization for which the person works, the person's title within the organization, and the department in which the person works within the organization. The event identification component 344 may analyze the contacts data 360 to determine various aspects of the event information that is displayed to the user, such as whether the user is likely to have previously met people who are scheduled to attend particular events.

The PIM 340 may also include a tasks manager 362, and the event identification component 344 may obtain tasks data 364 from the tasks manager 362. Alternatively, or in addition, the event identification component 344 may obtain tasks data 364 from one or more other applications or services that are external to the PIM 340. The tasks data 364 may include information about tasks that are included in one or more task lists that are maintained by the user. The event identification component 344 may analyze the tasks data 364 to determine additional information about events that are included in the calendar data 356, such as file(s) and/or conversation(s) that are relevant to the events. The tasks data 364 may also include information about additional events that are not included in the calendar data 356.

The PIM 340 may also include a notes manager 366, and the event identification component 344 may obtain notes data 368 from the notes manager 366. Alternatively, or in addition, the event identification component 344 may obtain notes data 368 from one or more other applications or services that are external to the PIM 340. The notes data 368 may include information about notes that have been created by the user. The event identification component 344 may analyze the notes data 368 to determine additional information about events that are included in the calendar data 356. The notes data 368 may also include information about additional events that are not included in the calendar data 356.

The event identification component 344 may also search stored files 370 and stored conversations 372 for files and conversations that are relevant to events involving the user. As noted above, machine learning and artificial intelligence techniques may be utilized to identify relevant files and conversations. In some embodiments, the event identification component 344 (or another component within the PIM 340) may be configured to utilize such techniques. Alternatively, or additionally, the PIM 340 may coordinate with one or more other applications that are configured to utilize such techniques.

Figure 4:
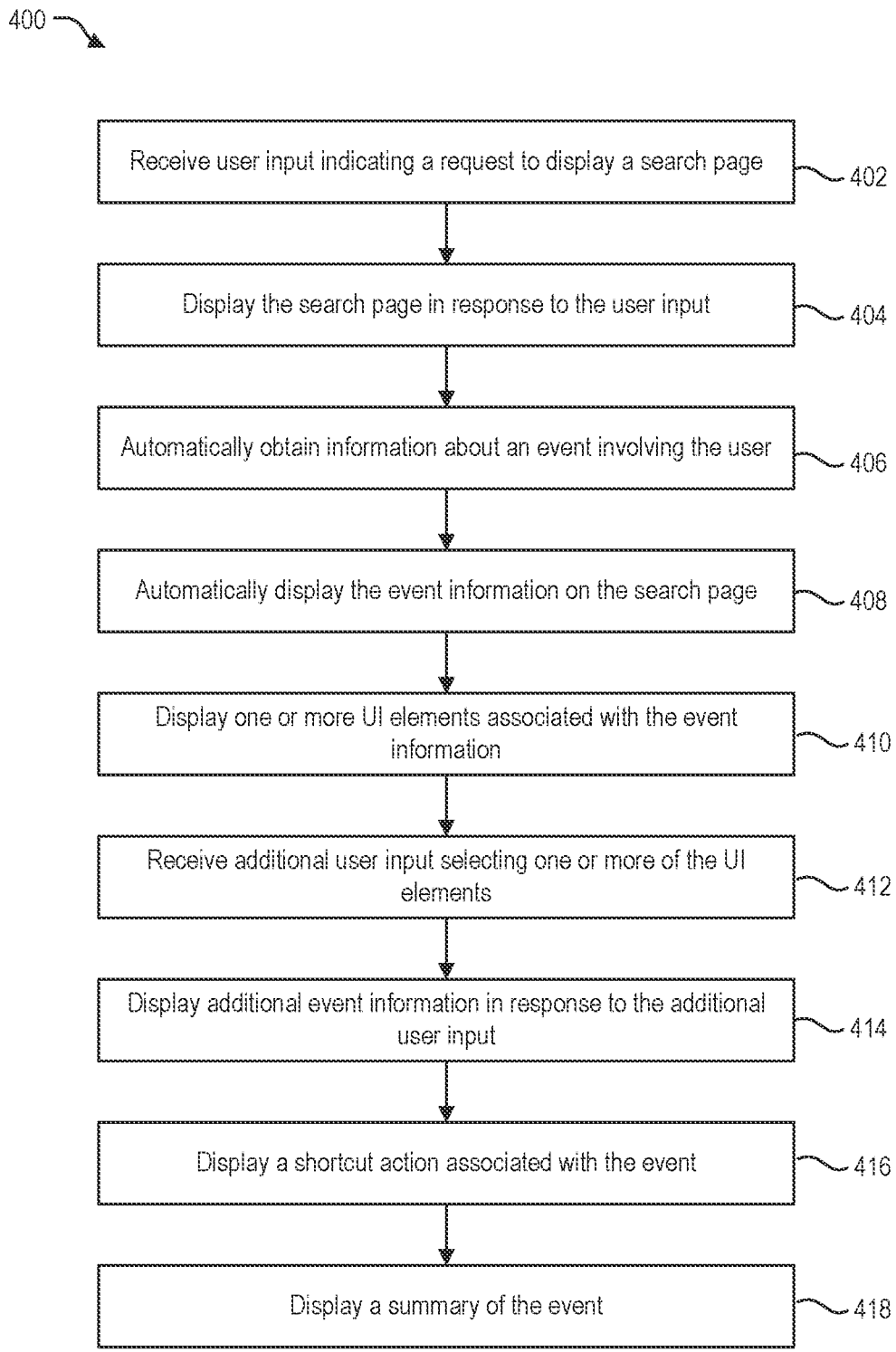
FIG. 4 illustrates an example of a method for proactively providing information to a user about an event involving the user in accordance with the present disclosure.

FIG. 4 illustrates an example of a method 400 for proactively providing information to a user about an event involving the user in accordance with the present disclosure. The method 400 may be implemented by a software application, such as a personal information manager, that facilitates the recording, tracking, and management of certain types of information about a person's life.

Step 402 of the method 400 includes receiving user input 346 indicating a request to display a search page 102*b*. In some embodiments, this may include detecting the user's selection of a search icon 104 on another page 102*a* of the user interface (i.e., a page 102*a* other than the search page 102*b*). Step 404 of the method 400 includes displaying the search page 102*b* in response to the user input 346.

Step 406 of the method 400 includes automatically obtaining, in response to the user input 346, event information 348 about an event involving the user. In some embodiments, a personal information manager may obtain the event information 348 by determining the event information 348 (as described above in connection with FIG. 3, for example). Alternatively, a personal information manager may obtain event information 348 by sending a request to a server for the event information 348. This will be described in greater detail below in connection with FIG. 5.

Step 408 of the method 400 includes automatically displaying the event information 348 on the search page 102*b*. As noted above, in this context the term "automatically" means without requiring additional user input. Thus, in response to receiving user input 346 indicating a request to display a search page 102*b* (in step 402), the software application obtains event information 348 (in step 406) and displays the event information on the search page 102*b* (in step 408) without requiring any additional user input.

There are many different types of event information 348 that may be displayed. Some examples of event information 348 include participant information (information about one or more participants in the event other than the user), file information (information about one or more files that are relevant to the event), and conversation information (information about one or more conversations that are relevant to the event).

Step 410 of the method 400 includes displaying one or more UI elements associated with the event information 348, such as the buttons 108*a-d* shown in FIG. 1B. The buttons 108*a-d* each include some event information 348. Step 412 includes receiving additional user input selecting one or more of the UI elements. Step 414 includes displaying additional event information in response to the additional user input selecting the UI element(s).

For example, suppose that step 410 includes displaying a UI element (e.g., a button 108*a*, as shown in FIG. 1B) that includes a message indicating that the user will meet new people at the event, and step 412 includes receiving additional user input selecting that UI element. In this example, step 414 may include displaying additional event information such as names of the new people that the user will meet, their titles, the departments in which they work, their contact information, and so forth. In some embodiments, this additional event information may be displayed in successive stages, as described above in connection with FIGS. 1C and 1D.

As another example, suppose that step 410 includes displaying a UI element (e.g., a button 108*b*, as shown in FIG. 1B) that includes a message about one or more files that the user should review prior to the event, and step 412 includes receiving additional user input selecting that UI element. In this example, step 414 may include displaying additional event information such as the filenames and/or previews of the files that should be reviewed. In some embodiments, this additional event information may be displayed in successive stages, as described above in connection with FIGS. 1E and 1F.

As another example, suppose that step 410 includes displaying a UI element (e.g., a button 108*c*, as shown in FIG. 1B) that includes a message about one or more conversations that the user should review prior to the event, and step 412 includes receiving additional user input selecting that UI element. In this example, step 414 may include displaying additional information about the conversation(s) (e.g., the subject lines associated with email conversations). If the user selects a particular conversation, some portion of the message body of a message belonging to the conversation may be displayed. In some embodiments, this additional event information may be displayed in successive stages, as described above in connection with FIGS. 1G and 1H.

Step 416 of the method 400 includes displaying a shortcut action associated with the event. This step 416 may be performed if the event is a future event. For example, if the event is an online meeting that is scheduled to occur at some point in the future, step 416 may include displaying a link to join the online meeting.

Step 418 of the method 400 includes displaying a summary of the event. This step 418 may be performed with respect to a past event, i.e., an event that has already occurred. Some examples of information that may be included in an event summary include notes that the event participants have taken and any action items that were decided upon during the event.

Figure 5:
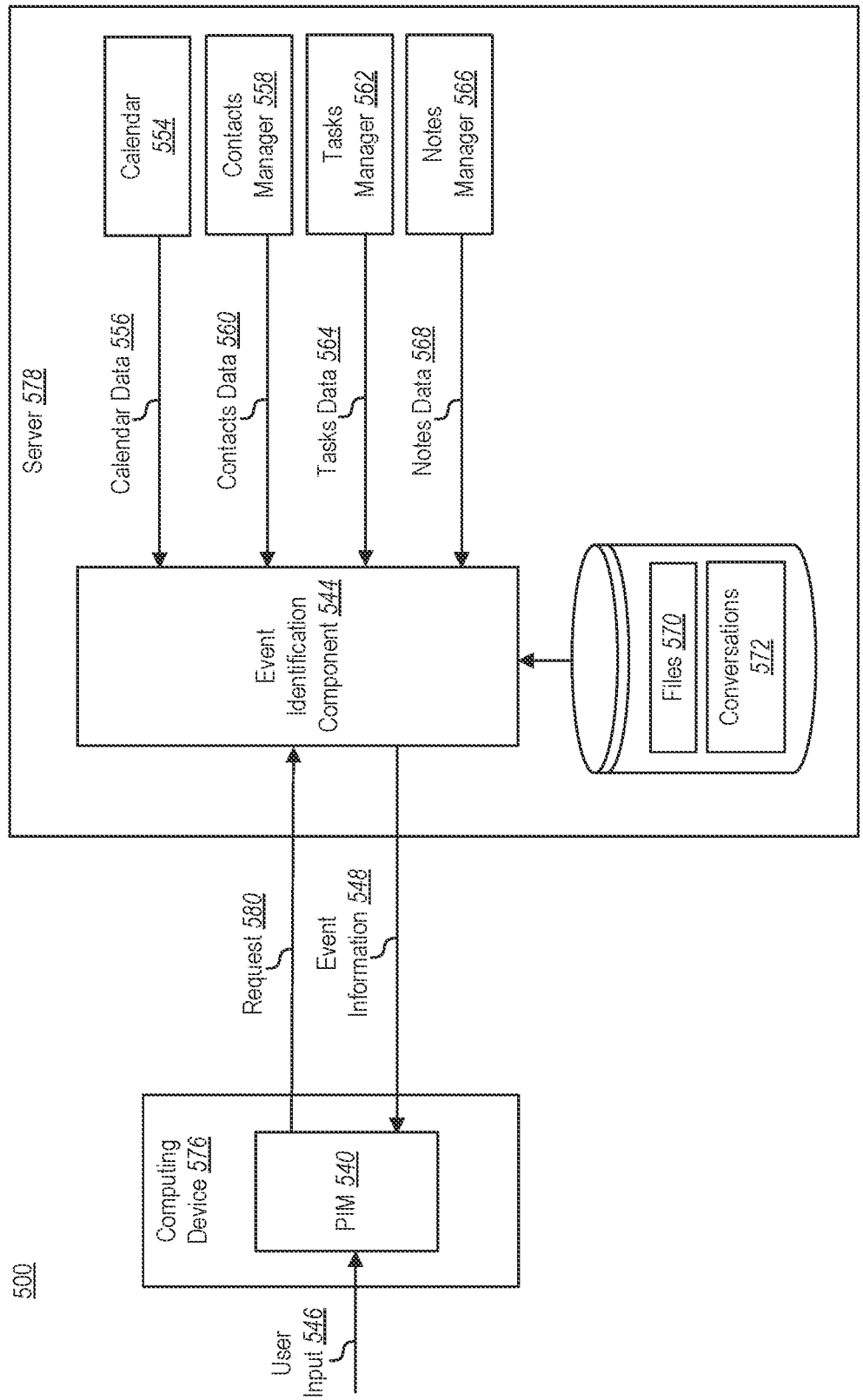
FIG. 5 illustrates an example of a system that includes a personal information manager on a computing device that is in electronic communication with a server.

FIG. 5 illustrates an example of a system 500 that includes a personal information manager (PIM) 540 on a computing device 576. The PIM 540 is in electronic communication with a server 578. Communication between the PIM 540 and the server 578 may occur via one or more computer networks, which may include the Internet.

As discussed above, the PIM 540 may be configured to receive user input 546 indicating a request to display a search page, and to display the search page in response to the user input. The PIM 540 may also be configured to obtain, in response to the user input 546, event information 548 about an event involving the user. To obtain the event information 548, the PIM 540 may send a request 580 to the server 578.

The server 578 may receive the request 580 from the PIM 540. In response to receiving the request 580, the server 578 may determine the event information 548. The server 578 is shown with an event identification component 544. The event identification component 544 may operate similarly to the event identification component 344 that was described above in connection with FIG. 3. For example, the event identification component 544 may analyze data from various sources in order to determine the event information 548. These sources may include, for example, calendar data 556 from a calendar 554, contacts data 560 from a contacts manager 558, tasks data 564 from a tasks manager 562, and notes data 568 from a notes manager 566. The event identification component 544 may also analyze stored files 570 and stored conversations 572 in order to determine the event information 548. The calendar data 556, contacts data 560, tasks data 564, notes data 568, files 570, and conversations 572 may be associated with the user of the PIM 540.

Once the event information 548 has been determined, the server 578 may send the event information 548 to the PIM 540. The PIM 540 may receive the event information 548 from the server 578 and display the event information 548 on the search page.

The PIM 540 may automatically obtain the event information 548 from the server 578 and automatically display the event information 548 in response to the user input 546. In other words, once the user input 546 has been received, the PIM 540 may send the request 580 to the server 578 and receive the event information 548 from the server 578 without requiring any additional user input.

The computing device 576 may be any electronic equipment that includes memory and a processor that is configured to follow instructions stored in the memory to perform sequences of mathematical and logical operations. Some examples of computing devices that may be used in connection with the disclosed embodiments include desktop computers, laptop computers, smartphones, tablet computers, smartwatches, virtual reality headsets, and fitness trackers.

The server 578 may be implemented using a single computing device or a plurality of computing devices. In some embodiments, the server 578 may be implemented as a distributed computing system (e.g., a cloud computing system) whose components are located on multiple computing devices. For example, a distributed computing system may include a plurality of distinct processing, memory, storage, and communication components that are connected by one or more communication networks. The various components of a distributed computing system may communicate with one another in order to coordinate their actions.

Figure 6:
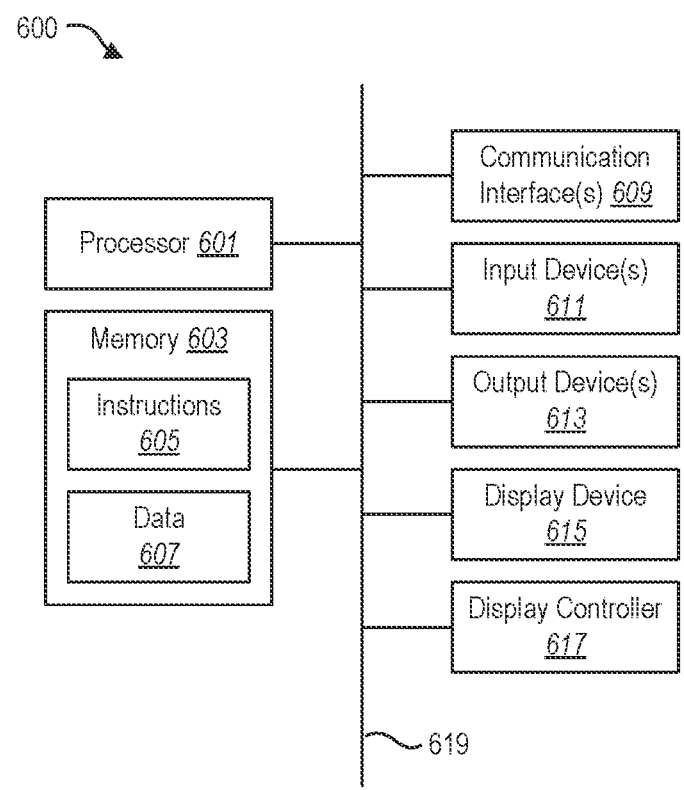
FIG. 6 illustrates certain components that may be included within a computing system.

As noted above, the techniques disclosed herein may be implemented by a software application such as a personal information manager. FIG. 6 illustrates certain components that may be included within a computing system 600 on which such a software application may run.

The computing system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computing system 600 of FIG. 6, in an alternative configuration, a combination of processors (e.g., an ARM and DSP) could be used.

The computing system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor 601, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the methods, steps, operations, actions, or other functionality that is disclosed herein. For example, the instructions 605 may be executable by the processor 601 to implement the method 400 shown in FIG. 4. Executing the instructions 605 may involve the use of the data 607 that is stored in the memory 603. Unless otherwise specified, any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

The computing system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing system 600 may also include one or more input devices 611 and one or more output devices 613. Some examples of input devices 611 include a keyboard, mouse, microphone, remote control device, button, joystick, trackball, touchpad, and lightpen. One specific type of output device 613 that is typically included in a computing system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615. The computing system 600 may also include other types of output devices 613, such as a speaker, a printer, etc.

The various components of the computing system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for proactively presenting information associated with an event involving a user, the method comprising:
    receiving, at a client device of the user, a selection of a search icon associated with presenting event information for events associated with the user;
    obtaining event information about an upcoming event associated with the user, wherein obtaining the event information comprises, in response to receiving the selection of the search icon and without receiving additional inputs other than the selection of the search icon:
        identifying a calendar invitation for the upcoming event;
        identifying at least one email conversation associated with the calendar invitation;
        identifying at least one file associated with the calendar invitation; and
        identifying at least one contact from a contact database included within the calendar invitation based on the at least one contact not being included within a contact list of the user of the client device; and
    generating and presenting an event icon within a graphical user interface of a displayed search page on the client device, the event icon including a plurality of selectable icons, each of the selectable icons being associated with one of the at least one email conversation associated with the calendar invitation and at least one file associated with the calendar invitation.

2. The method of claim 1, further comprising:
    detecting a selection of a selectable icon from the plurality of selectable icons being associated with the identified at least one email conversation; and
    causing the at least one email conversation to be displayed on the client device.

3. The method of claim 1, further comprising:
    detecting a selection of a selectable icon from the plurality of selectable icons being associated with the identified at least one file associated with the calendar invitation; and
    causing the at least one file to be displayed on the client device.

4. The method of claim 1, wherein identifying the at least one email conversation associated with the calendar invitation is based on the at least one email conversation being attached to the calendar invitation, and wherein identifying the at least one file associated with the calendar invitation is based on the at least one file being attached to the calendar invitation.

5. The method of claim 1, further comprising:
    detecting a selection of a selectable icon from the plurality of selectable icons being associated with the at least one file associated with the calendar invitation; and
    providing, based on the detected selection of the selectable icon, a display of a preview of the at least one file associated with the calendar invitation, the display of the preview being presented within the graphical user interface of the displayed search page.

6. The method of claim 1, further comprising:
    detecting a selection of a selectable icon from the plurality of selectable icons being associated with the at least one file associated with the calendar invitation; and
    providing, based on the detected selection of the selectable icon, a filename indicating a location of a file source for the at least one file associated with the calendar invitation.

7. The method of claim 1, further comprising:
    detecting a selection of a selectable icon from the plurality of selectable icons being associated with the at least one email conversation; and
    based on the detected selection of the selectable icon, providing a display of a preview of the at least one email conversation, the display of the preview being presented within the graphical user interface of the displayed search page.

8. The method of claim 1, wherein the search icon is presented on a home page of an electronic communication application.

9. The method of claim 1, further comprising:
    detecting a selection of a selectable icon from the plurality of selectable icons being associated with the at least one contact, the selectable icon including a link to a social media page associated with the at least one contact; and
    providing a display of the social media page in response to detecting the selection of the selectable icon being associated with the at least one contact.

10. A system, comprising:
    at least one processor;
    memory in electronic communication with the at least one processor; and
    instructions stored in the memory, the instructions being executable by the at least one processor to:
        receive, at a client device of the user, a selection of a search icon associated with presenting event information for events associated with the user;
        obtain event information about an upcoming event associated with the user, wherein obtaining the event information comprises, in response to the selection of the search icon and without receiving additional inputs other than the selection of the search icon:
            identifying a calendar invitation for the upcoming event;

identifying at least one email conversation associated with the calendar invitation;

identifying at least one file associated with the calendar invitation; and identifying at least one contact from a contact database included within the calendar invitation based on the at least one contact not being included within a contact list of the user of the client device; and generate and present an event icon within a graphical user interface of a displayed search page on the client device, the event icon including a plurality of selectable icons, each of the selectable icons being associated with one of the at least one email conversation associated with the calendar invitation and at least one file associated with the calendar invitation.

11. The system of claim 10, further comprising instructions being executable by the at least one processor to:

detect a selection of a selectable icon from the plurality of selectable icons being associated with the identified at least one email conversation; and cause the at least one email conversation to be displayed on the client device.

12. The system of claim 10, further comprising instructions being executable by the at least one processor to:

detect a selection of a selectable icon from the plurality of selectable icons being associated with the identified at least one file associated with the calendar invitation; and cause the at least one file to be displayed on the client device.

13. The system of claim 10, wherein identifying the at least one email conversation associated with the calendar invitation is based on the at least one email conversation being attached to the calendar invitation, and wherein identifying the at least one file associated with the calendar invitation is based on the at least one file being attached to the calendar invitation.

14. The system of claim 10, wherein the search icon is presented on a home page of an electronic communication application.

15. A non-transitory computer readable medium storing instructions thereon that, when executed by at least one processor, causes a client device to:

receive a selection of a search icon associated with presenting event information for events associated with a user of the client device;

obtain event information about an upcoming event associated with the user, wherein obtaining the event information comprises, in response to the selection of the search icon and without receiving additional inputs other than the selection of the search icon:

identifying a calendar invitation for the upcoming event;

identifying at least one email conversation associated with the calendar invitation;

identifying at least one file associated with the calendar invitation; and identifying at least one contact from a contact database included within the calendar invitation based on the at least one contact not being included within a contact list of the user of the client device; and generate and present an event icon within a graphical user interface of a displayed search page on the client device, the event icon including a plurality of selectable icons, each of the selectable icons being associated with one of the at least one email conversation associated with the calendar invitation and at least one file associated with the calendar invitation.

16. The non-transitory computer readable medium of claim 15, further comprising instructions that, when executed by the at least one processor, causes the client device to:

detect a selection of a selectable icon from the plurality of selectable icons being associated with the identified at least one email conversation; and cause the at least one email conversation to be displayed on the client device.

17. The non-transitory computer readable medium of claim 15, further comprising instructions that, when executed by the at least one processor, causes the client device to:

detect a selection of a selectable icon from the plurality of selectable icons being associated with the identified at least one file associated with the calendar invitation; and cause the at least one file to be displayed on the client device.

18. The non-transitory computer readable medium of claim 15, wherein identifying the at least one email conversation associated with the calendar invitation is based on the at least one email conversation being attached to the calendar invitation, and wherein identifying the at least one file associated with the calendar invitation is based on the at least one file being attached to the calendar invitation.

19. The non-transitory computer readable medium of claim 15, wherein the search icon is presented on a home page of an electronic communication application.

20. The method of claim 1, wherein acts of identifying the calendar invitation for the upcoming event, identifying the at least one email conversation associated with the calendar invitation, and identifying the at least one file associated with the calendar invitation are performed after receiving the selection of the search icon associated with presenting event information for events associated with the user.

* * * * *